(12) United States Patent
Murai et al.

(10) Patent No.: US 6,195,144 B1
(45) Date of Patent: *Feb. 27, 2001

(54) MULTIPLE DOMAIN-DIVIDED TWISTED NEMATIC LIQUID CRYSTAL DISPLAY WITH COMPENSATION FILM

(75) Inventors: Hideya Murai; Masayoshi Suzuki; Teruaki Suzuki, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,627

(22) Filed: Apr. 30, 1997

(30) Foreign Application Priority Data

Apr. 30, 1996 (JP) .................................. 8-108813

(51) Int. Cl.[7] .................................. G02F 1/1337
(52) U.S. Cl. .................................. 349/117; 349/129
(58) Field of Search .................................. 349/117, 129, 349/120, 179

(56) References Cited

U.S. PATENT DOCUMENTS 5,473,455 * 12/1995 Koike et al. .................... 359/76

FOREIGN PATENT DOCUMENTS

| | | |
|---|---|---|
| 2-256021 | 10/1990 | (JP) . |
| 3-73920 | 3/1991 | (JP) . |
| 3-103823 | 4/1991 | (JP) . |
| 4-55827 | 2/1992 | (JP) . |
| 4-55830 | 2/1992 | (JP) . |
| 7-104284 * | 4/1995 | (JP) . |
| 7-175037 | 7/1995 | (JP) . |
| 7-253578 | 10/1995 | (JP) . |
| 9-203894 | 8/1997 | (JP) . |

OTHER PUBLICATIONS

T. Kamada et al., "Wide Viewing Angle Full Color TFT LCSs", Technical Report of IEICE, EID92–98 (1992–12), pp. 35–40.*

B. Bahadur, Liquid Crystals Application and Uses, vol. 1, 1990, pp. 263–265.*

* cited by examiner

Primary Examiner—Robert Kim
Assistant Examiner—Andrew H. Lee
(74) Attorney, Agent, or Firm—Sughrue, Mion, Zinn, Macpeak & Seas, PLLC

(57) ABSTRACT

Disclosed is a liquid crystal display, which has a polarization film and a liquid crystal layer and displays a black tone when a voltage is not applied, provided with: a compensation film which is disposed between the liquid crystal layer and the polarization film and has an optical structure that has a twist direction reverse to a twist direction of liquid crystal in the liquid crystal layer; wherein a pixel in the liquid crystal layer is divided into a plurality of domains.

9 Claims, 7 Drawing Sheets

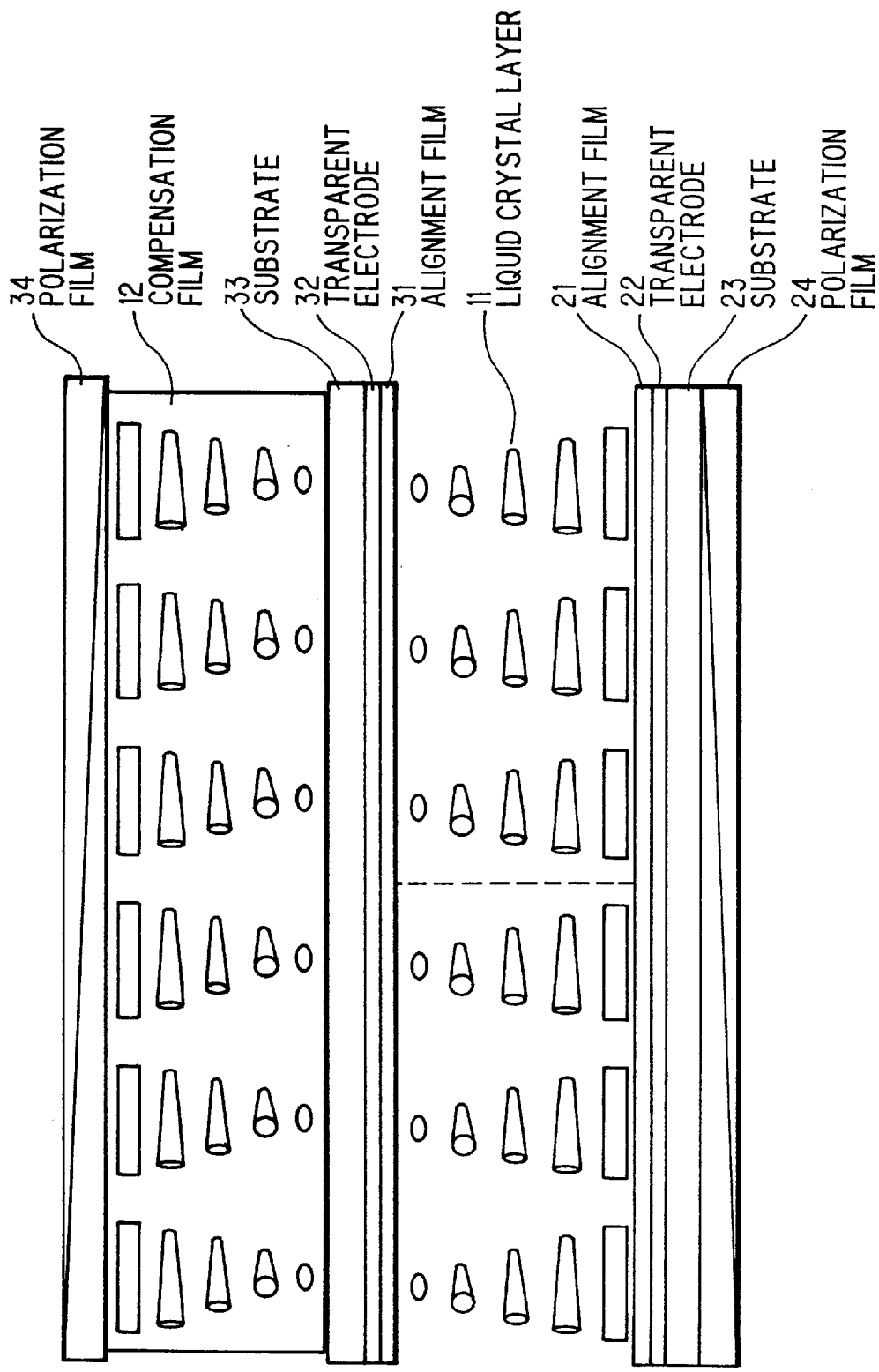

MULTIPLE DOMAIN-DIVIDED TWISTED NEMATIC LIQUID CRYSTAL DISPLAY WITH COMPENSATION FILM

FIELD OF THE INVENTION

This invention relates to a liquid crystal display, and more particularly to, a twisted nematic(TN) type liquid crystal display with normally black(NB) mode.

BACKGROUND OF THE INVENTION

In a twisted nematic(TN) type liquid crystal display with normally white mode(rW mode), which is generally used, the polarization axes of upper and lower polarization films are disposed to be orthogonal to each other, where a white tone is displayed when a voltage is not applied. The NW mode liquid crystal display has a problem that the viewing angle is narrow due to a proper behavior of liquid crystal molecule when applying the voltage, in particular, the transmittance in the oblique direction while displaying a black tone is increased to reduce the contrast. On the other hand, there is a normally black(NB) mode liquid crystal display in which the polarization axes of upper and lower polarization films are disposed to be nearly parallel to each other, where a black tone is displayed when a voltage is not applied. Though the NB mode liquid crystal display also has a tendency that the transmittance an the oblique direction is increased, the transmittance-increasing tendency is lower than the NW mode.

For the purpose of enlarging the viewing angle, for example, Japanese patent application laid-open No.7-104284(1995), which is filed by this commonly assigned applicant, discloses a liquid crystal display which comprises a liquid crystal display panel with a twisted liquid crystal orientation, and an optical compensation plate which is composed of molecules with a refractive index anisotropy opposite to that of the liquid crystal molecules, and has a twisted orientation structure reverse to that of the liquid crystal molecules Also, T.Kamada et al., "Wide Viewing Angle Full Color TFT LCDs", Technical Report of IEICE, EID92-82(1992-12) suggests a NB mode liquid crystal display which comprises transparent electrodes and alignment films formed on a pair of substrates and; a liquid crystal layer which is sandwiched between the alignment films, where each pixel is divided into two domains with different rising directions of liquid crystal molecules by a domain-dividing technique and an enlarged viewing angle is obtained by using a uniaxial compensation film.

Furthermore, another technique called 'multi-gap manner' has been suggested. This technique is based on the optical transmittance of a NB mode liquid crystal display which is determined by optical wavelength $\lambda$, birefringence $\Delta n$ of liquid crystal layer and thickness d of cell, regardless of the existence of the divided pixel or uniaxial compensation film as shown in FIG. 2. In this case, since $\Delta n$ can be approximated at a constant, a NB mode full color liquid crystal display utilizing three primary colors of RGB is provided with different cell thicknesses d to the respective wavelengths $\lambda$ in order to display a black tone, i.e., uneven areas are formed corresponding to pixels of RGB on the substrate.

However, the viewing angle in conventional liquid crystal displays is actually limited within a low range. In particular, the requirement for a larger viewing angle in a large-screen liquid crystal display or an onboard liquid crystal display is not satisfied. Though the 'multi-gap manner' described above is effective to some extent, forming the uneven areas corresponding to the pixels of RGB and controlling gaps to the respective pixels are very difficult. Also, there occurs a problem that the rubbing operation for alignment of liquid crystal molecules is obstructed by the uneven ares.

SUMMARY OF THE INVENTION

Accordingly, it is an object of the invention to provide a liquid crystal display in which the viewing angle can be substantially enlarged.

It is a further object of the invention to provide a liquid crystal display which can be easily produced and controlled in its operation.

According to the invention, a liquid crystal display, which includes at least a polarization film and a liquid crystal layer and displays a black tone when a voltage is not applied, comprising:

a compensation film which is disposed between the liquid crystal layer and the polarization film and has an optical structure having a twist direction reverse to the twist direction of liquid crystal in the liquid crystal layer;

wherein a pixel in the liquid crystal layer is divided into a plurality of domains.

BRIEF DESCRIPTION OF THE DRAWINGS

The invention will be explained in more detail in conjunction with the appended drawings, wherein:

FIG. 3 is an illustrative cross sectional view showing a liquid crystal display in a preferred embodiment according to the invention, FIGS. 4A and 4B snow viewing angle characteristics in right/left direction and up/down direction, respectively, of the liquid crystal display in FIG. 3, FIGS. 5A and 5B show viewing angle characteristics in the right/left direction and up/down direction, respectively, of the liquid crystal display in FIG. 3 while using a reverse twist type of compensation filter with a positive birefringence.

DESCRIPTION OF THE PREFERRED EMBODIMENTS

Before explaining a liquid crystal display in the preferred embodiments, the aforementioned conventional liquid crystal display will be explained in FIG. 1.

Figure 1:
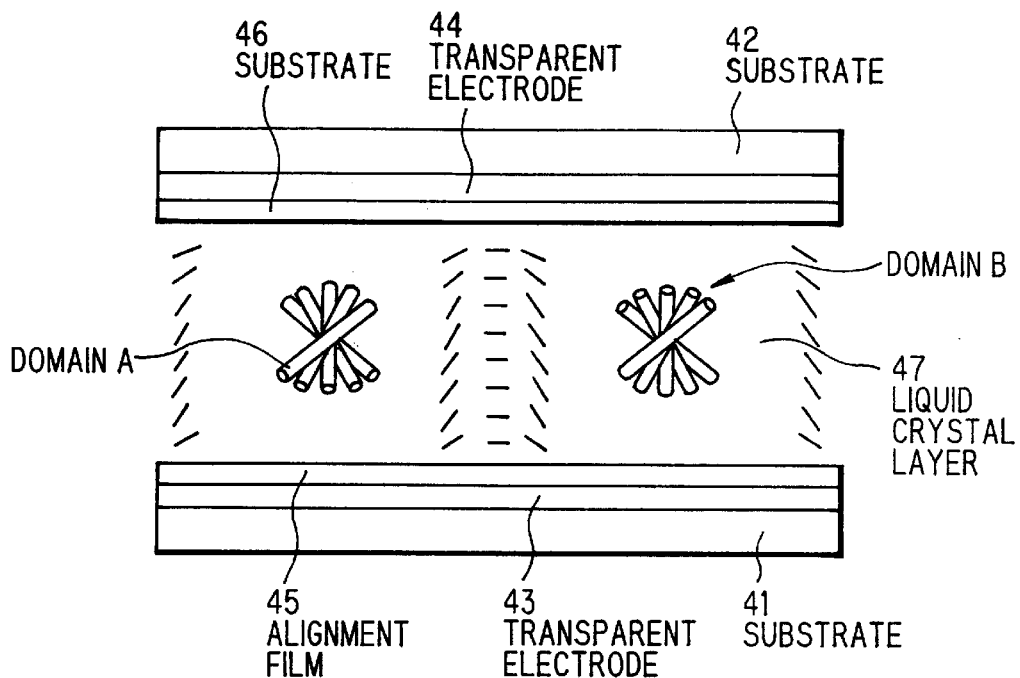
FIG. 1 is an illustrative cross sectional view showing a conventional liquid crystal display.
Figure 2:
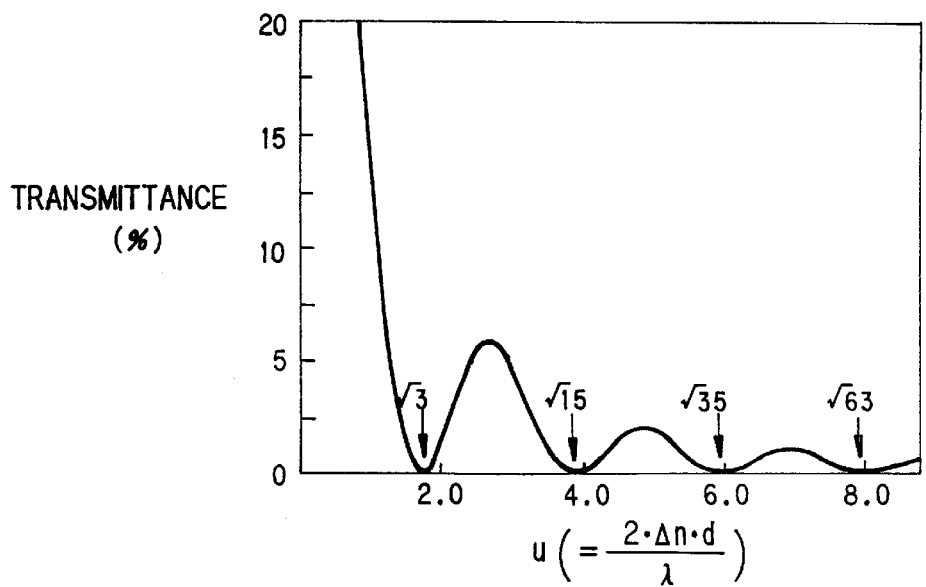
FIG. 2 shows the wavelength and cell gap dependence of transmittance for the NB mode of a conventional multi-gap manner liquid crystal display.

The liquid crystal display comprises, as shown in FIG. 1, transparent electrodes 43, 44 and alignment films 45, 46 formed on a pair of substrates 41, 42 and a liquid crystal layer 47 which is sandwiched between the alignment films 45, 46, where each pixel is divided into two domains A, B with different rising directions of liquid crystal molecules by a domain-dividing technique and an enlarged viewing angle is obtained by using a uniaxial compensation film.

Next, a liquid crystal display in the first preferred embodiment will be explained in FIG. 3.

In this embodiment, a transparent electrode 22 and an alignment film 21 are formed on a substrate 23, a transparent electrode 32 and an alignment film 31 are formed on a substrate 33, and a liquid crystal layer 11 composed of 90° twisted liquid crystal is disposed between the substrates 23, 33. In the liquid crystal layer 11, a pixel is divided into a plurality of domains, where the dividing border is indicated by a dotted line in FIG. 3. The respective domains are provided with different characteristics, and, in this example, the respective domains bordered by the dotted line have different rising directions of liquid crystal molecule when a voltage is applied.

Furthermore, a polarization film. 24 is disposed outside the substrate 23 and a polarization film 34 is disposed outside the substrate 33. Between the substrate 33 and the polarization film 34, a compensation film 12 is disposed which has an optical structure with a twist direction reverse to that of liquid crystal when not applying the voltage in the liquid crystal layer s11. In this case, while the liquid crystal molecule is twisted to the right, the optical element in the compensation film 12 is twisted to the left.

When the compensation film 12 with the reverse twist direction is used, the multi-gap manner is not necessary for NB mode. The reason will be explained below. An incident light linearly polarized by the polarization film 24 goes forward with the polarization plane rotated according to the twist direction of the liquid crystal molecule of the liquid crystal layer 11. However, since the rotation of the polarization plane depends on a wavelength, the light reaching the substrate 33 has different rotation angles depending on its respective wavelengths. Namely, in case of a conventional NB mode liquid crystal display in which the polarization film 34 is attached to the substrate 33 and which is not provided with the multi-gap, the light with some wavelength will be transmitted through, therefore failing to get a black display. In this regard, the liquid crystal display in FIG. 3, is provided with compensation film 12 having the reverse twist structure. In the compensation film 12, through the rotation of the polarization plane also depends on the wavelength of light, the polarization plane is rotated reversely to that of the liquid crystal layer 11 and the rotation angle difference of the polarization plane in different wavelengths of light can be therefore canceled. Thus, in this liquid crystal display, without employing the multi-gap structure, a black display in NB mode can be obtained by using the compensation film 12 with the reverse twist structure. Namely, the liquid crystal display in this embodiment can be easily produced and controlled in operation.

Figure 4A:
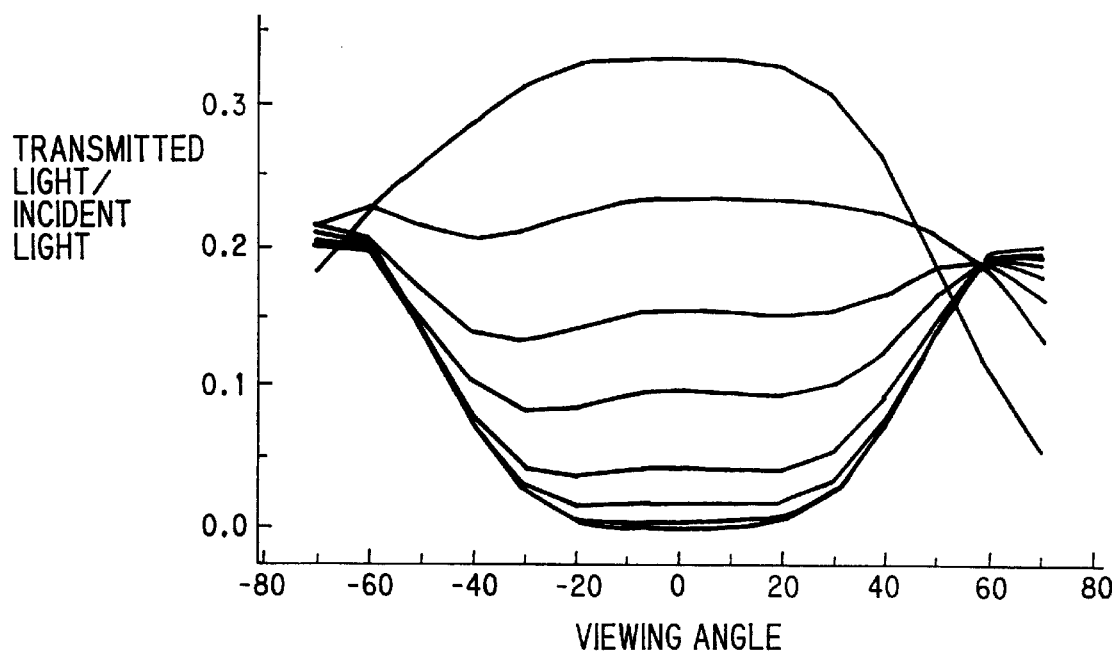
Figure 4B:
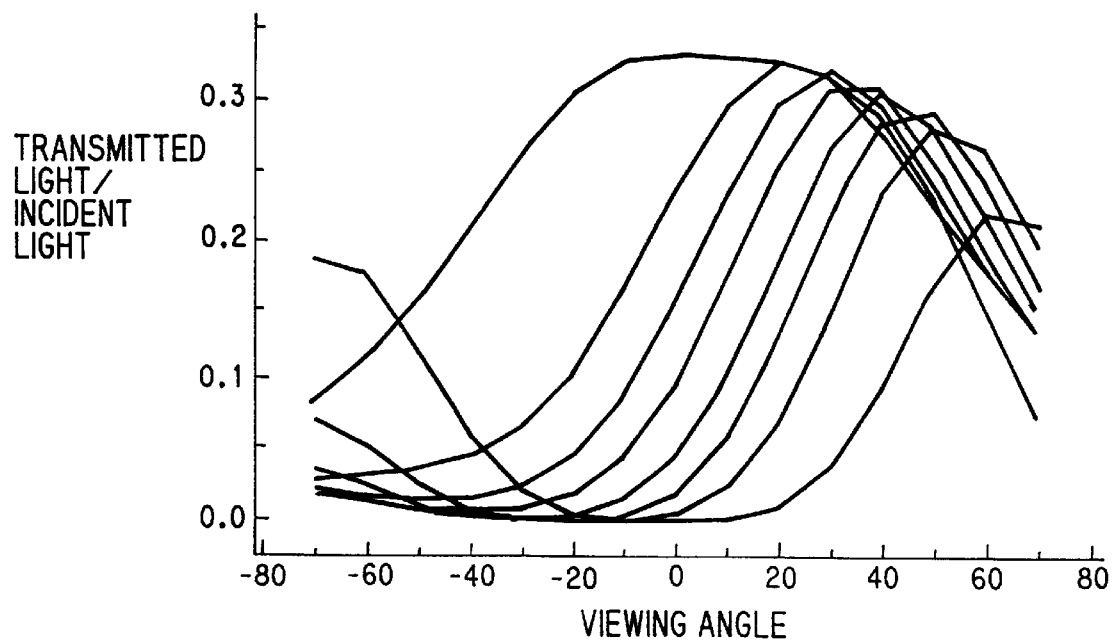
Figure 5A:
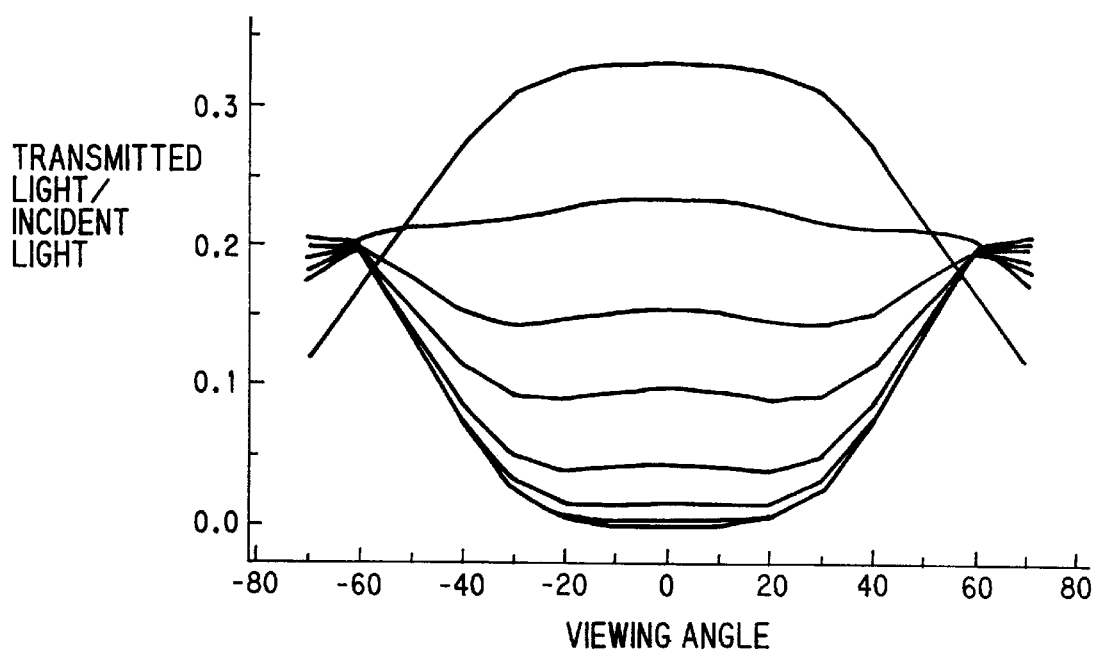
Figure 5B:
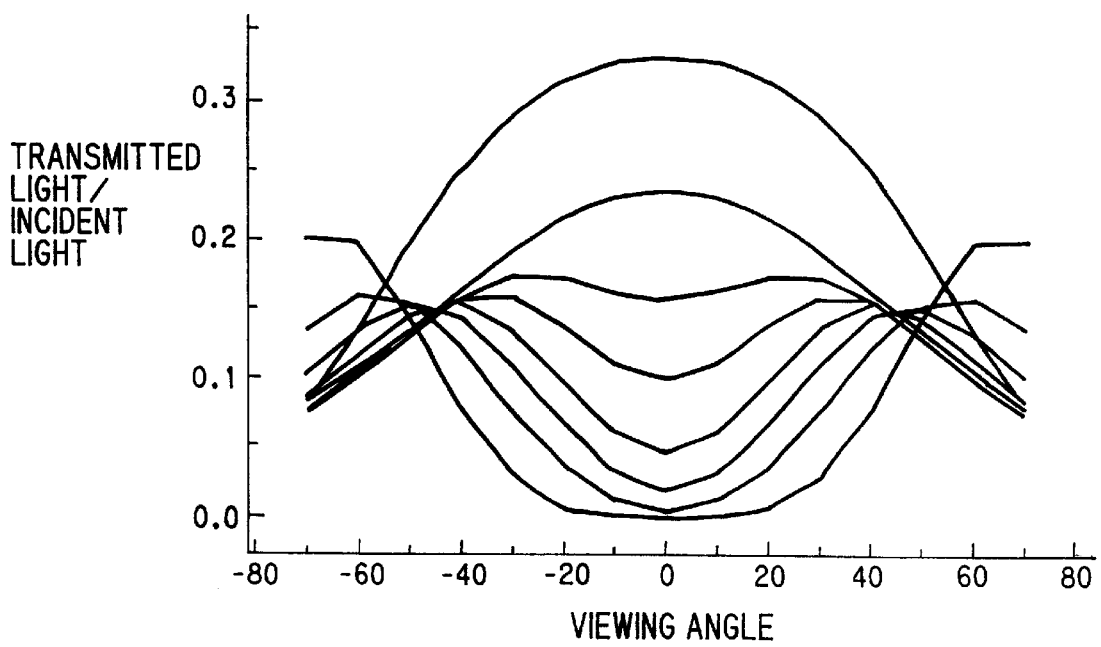

Furthermore, in this embodiment, since one pixel is divided into a plurality of domains, the viewing angle characteristics can be improved. FIGS. 4A and 4B show optical calculation results of the viewing angle characteristics of the liquid crystal display of the invention in which one pixel is divided into two domains with different rising directions (the two domains have the same twist direction of liquid crystal). On the other hand, FIGS. 5A and 5B show optical calculation results of the viewing angle characteristics in the case of employing the reverse twist type compensation film with a positive birefringence factor. Here, FIGS. 4A and 5A are regarding the right/left viewing direction, and FIGS. 4B and 5B are regarding the up/down viewing direction. As seen from FIGS. 4A to 5B, by dividing one pixel into two domains, asymmetry in the up/down viewing angle can be eliminated to provide the liquid crystal display with a wider viewing angle. Though the results in FIGS. 4A to 5B are as to the case of a single wavelength(550 nm), the wavelength dependency is small and, in particular, the front transmittance when not applying a voltage is, for a certain thickness of cell, suppressed to be small for any wavelengths.

Figure 6A:
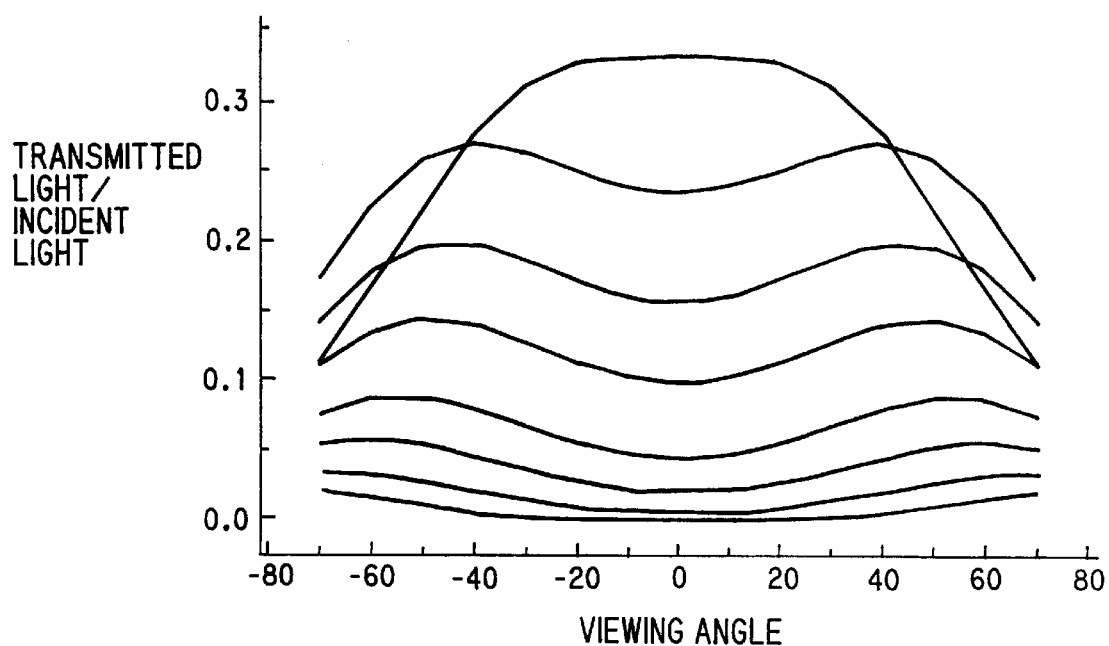
FIGS. 6A and 6B show viewing angle characteristics in the right/left direction and up/down direction, respectively, of a liquid crystal display in a second preferred embodiment according to the invention.
Figure 6B:
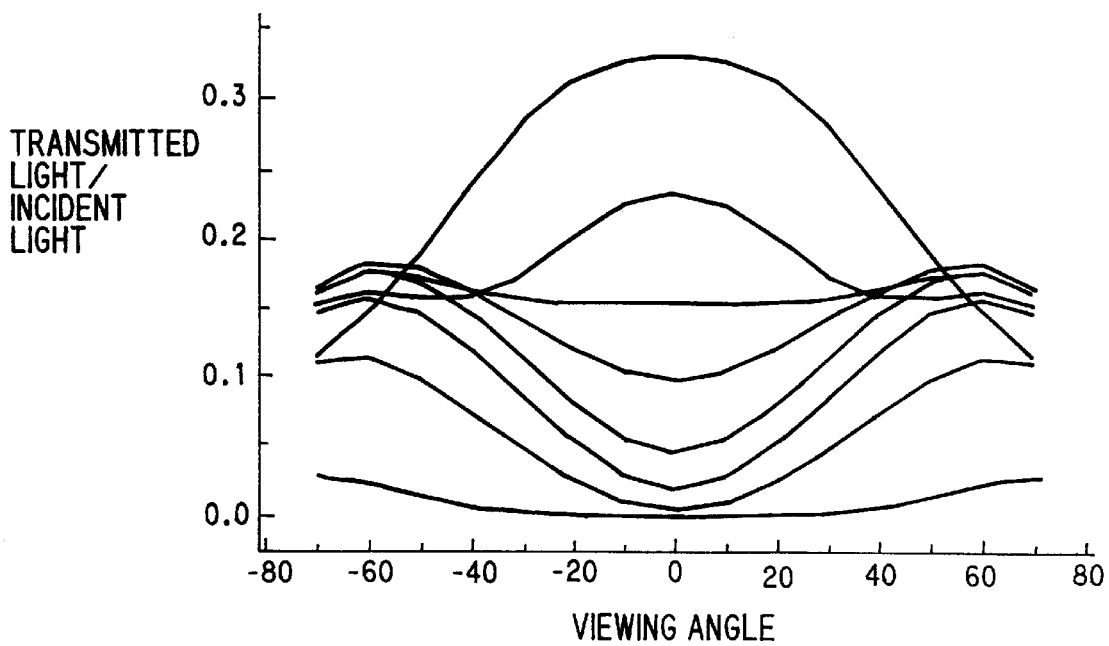

In the second preferred embodiment of this invention, the compensation film 12 may have a negative birefringence factor. By using such a compensation film, a liquid crystal display with a higher contrast can be obtained. FIGS. 6A and 6B show optical calculation results for such a liquid crystal display according to the invention, where each pixel is divided into two domains. FIGS. 6A and 6B are regarding the right/left viewing direction and the up/down viewing direction, respectively. As compared with the results in FIGS. 4A and 4B, the transmittance in the oblique direction when displaying black can be significantly reduced, therefore giving a higher contrast.

Figure 7:
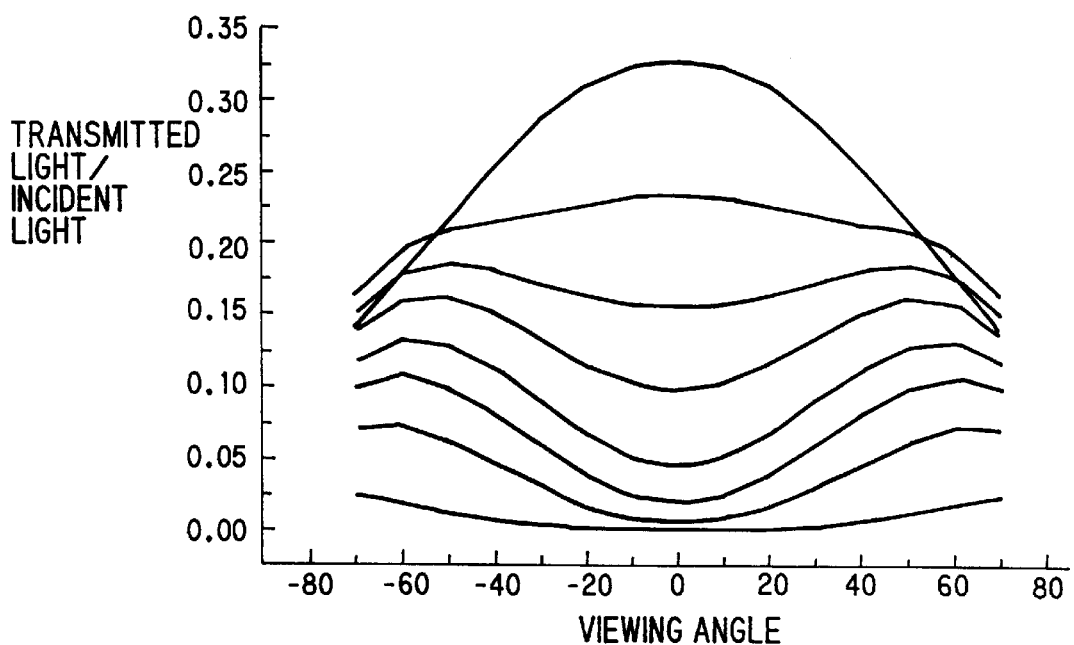
FIG. 7 shows viewing angle characteristics of a liquid crystal display in a third preferred embodiment according to the invention.

In the third preferred embodiment of the invention, each pixel is preferably divided into three or more domains, most preferably divided into four domains in view of symmetry. Also in these cases, the twist directions of liquid crystal in the domains are identical and are reverse to the twist direction in the compensation film 12. In this structure, a liquid crystal display with a wider viewing angle having no difference in viewing angle characteristics for any viewing directions can be obtained. FIG. 7 shows optical calculation results in the case of dividing the pixel into four domains. In the liquid crystal display with four divided domains, since the characteristics in the up/down viewing direction are not different from that in the right/left viewing direction, only the results regarding one of the viewing directions are shown in FIG. 7. As seen from FIG. 7, within a range less than 70°, there occurs little gray scale inversion. Therefore, as to a black display and half tone, an excellent liquid crystal display with a wide viewing angle can be obtained.

Figure 8:
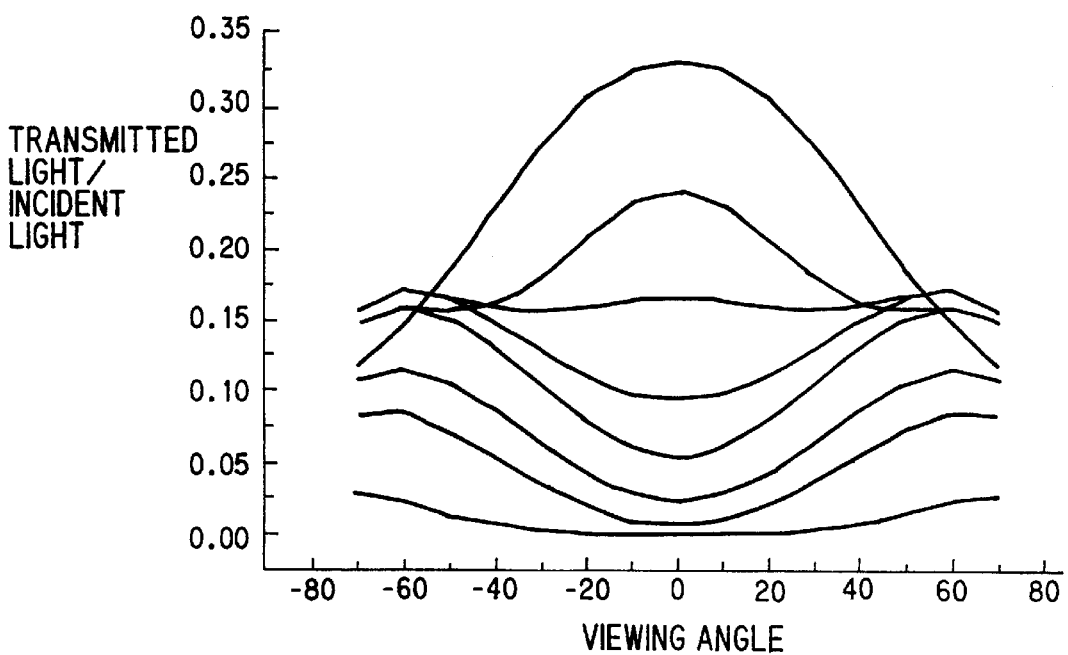
FIG. 8 shows viewing angle characteristics in the up/down direction of a liquid crystal display in a fourth preferred embodiment according to the invention.
Figure 9:
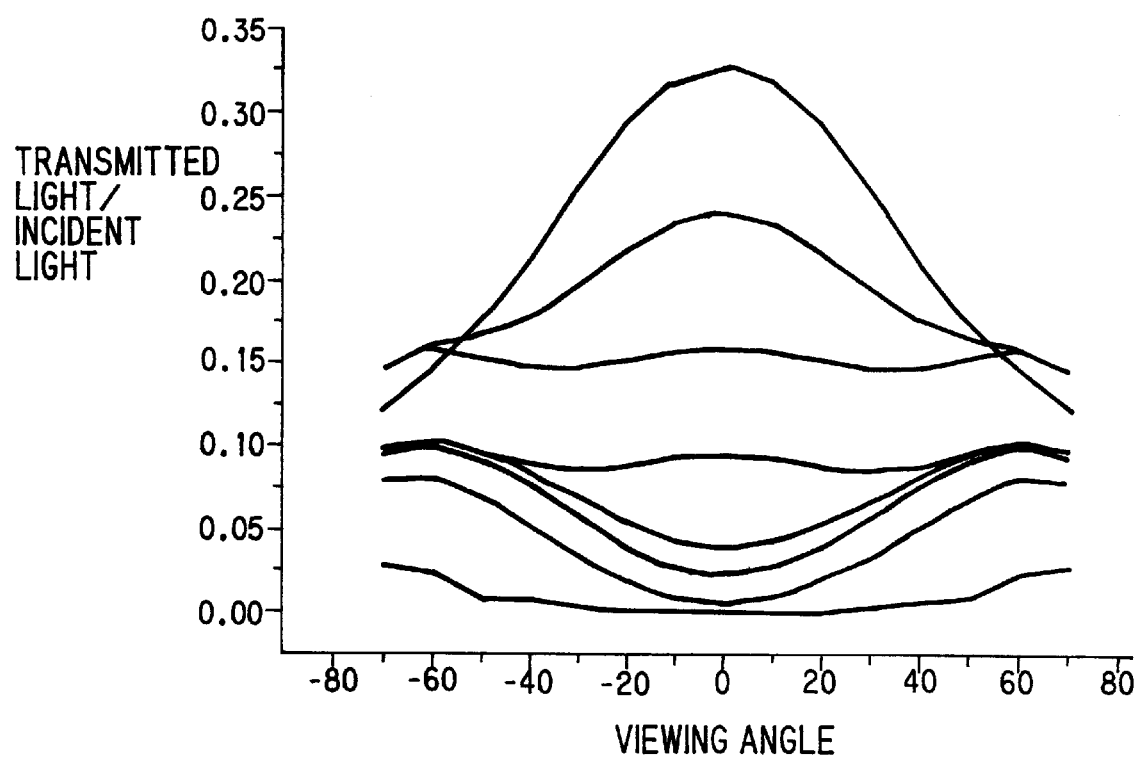
FIG. 9 shows viewing angle characteristics in up/down direction of a liquid crystal display in a fifth preferred embodiment according to the invention.

Further in the fourth and fifth preferred embodiments of the invention, different voltages may be applied to each or a part of the plurality of domains in each pixel. Producing the domains with different voltages applied in each pixel is achieved by, for example, a method of Deducing the applied voltage of a part of the pixel by using a capacity dividing technique. FIGS. 8 and 9 show optical calculation results in the up/down viewing direction of a liquid crystal display in which the applied voltage is reduced in half of the pixel and the reduction factors are 20%, 40%, respectively. In FIG. 9, each of two domains with different rising directions of liquid crystal is further divided into domains with different voltages applied. As compared with the case in FIG. 4B where there exists no part with an applied voltage reduced, by forming the part with an applied voltage reduced, the occurrence of gray scale inversion can be suppressed and the tone display in half tone can be improved.

Next, detailed examples of the invention will be described below as well as comparative examples.

Example 1

A substrate with an amorphous silicon thin-film transistor array(TFT) which has a pixel size of 100 $\mu$m×300 $\mu$m, a pixel number of 480×640×3 and a diagonal size in display screen of 240 mm is used. The TFT substrate is washed, then spin-coated with polyimide(manufactured by Nissan Kagaku, product name: SE-7210) to provide a high pretilt angle, and baked at 200° C. for a hour. Then, after rubbing it by using a rubbing apparatus, it is spin-coated with a resist(manufactured by Tokyo Ohka Kogyo, product name: OFPR-800C) to a thickness of 1 μm, and baked at 85° C. for 30 min. Then, it is exposed and developed by using a stripe pattern mask to cover half a pixel for all the pixels, rinsed with purified water, and dried at 75° C. for 20 min. Observing the formed pattern by using an optical microscope, it is proved that the resist pattern is formed to cover half a pixel for all the pixels.

Then, by using the rubbing apparatus, a rubbing in the reverse direction of the first rubbing is conducted. The substrate is treated with ethyl lactate for 2 min, rinsed with purified water, then dried at 110° C. for 30 min., thereby obtaining a main substrate. Then, a color filter substrate as the opposite substrate is washed, spin-coated with polyimide (manufactured by Nihon Gohsei Gomu, product name: AL-1051) to give a low pretilt angle, baked at 200° C. for an hour, then rubbed. The two substrates prepared as above are adhered through a globular spacer to have a gap of 5.2 μm and have their rubbing directions orthogonal to each other, thereby giving a panel. Then, nematic liquid crystal is injected into this panel and the injecting port is sealed. As the liquid crystal, nematic liquid crystal(manufactured by Merk Co., product name: ZLI 4792) mixed with a chiral agent (S811) to give a pitch length of 70 μm is used.

As the compensation film with the twist structure, a film including liquid crystal polymer as described in Japanese patent application laid-open No.3-87720(1991) is used. The film is prepared by coating an aligned glass substrate with a solution including liquid crystal polymer twisted to the right, drying and thermally treating. The film obtained has a structure that an optical element with a positive birefringence factor, is 90° twisted to the right, and its Δnd is nearly equal to Δnd(0.49 μm) of the liquid crystal layer.

Finally, the liquid crystal display is assembled by stacking the prepared members in the order of: a polarization film, the liquid crystal panel, the compensation film and a polarization film. Here, the two polarization films are disposed to be about orthogonal to each other. Then, a back light is provided for the obtained liquid crystal display to display an image. As a result, no coloring in a black display region can be observed. Furthermore, symmetrical optical characteristics can be obtained not only in the right/left direction but also in the up/down direction.

Comparative Example 1

A liquid crystal display, which is similar to that in Example 1 except having no compensation film and having the polarization axes of the two polarization films parallel to each other, is fabricated in the liquid crystal display, only black with a highly bluish tone is displayed for a black display and the contrast is also reduced.

Example 2

As the compensation film with the twist structure, layered uniaxial oriented polystyrene films are used. Since polystyrene is a polymer with side chains, a film with a negative refractive index can be obtained by the orientation. The compensation film is prepared by layering 9 polystyrene films with each orientation direction shifted by 10°. Since Δnd of the nematic liquid crystal used is 0.49 μm, the birefringence factor of each film is controlled to be −0.054 by adjusting the orientation process.

A liquid crystal panel prepared like Example 1 is assembled with polarization films and the above compensation film in the same order as Example 1. In this liquid crystal display, similarly to Example 1, no coloring in a black display region can be observed. Further, the viewing angle dependency of this liquid crystal display is investigated by setting it on a rotating stage and disposing a color brightness meter(Topcon, BM-5A) at the front of the liquid crystal display. The viewing angle dependency in the up/down and right/left directions is measured while 8 tones are displayed on the screen of the liquid crystal display. The brightness for a black display in the right/left direction is suppressed less than 10% in a very wide range. No gray scale inversion can be observed within a viewing angle of 60°. Also in the up/down direction, the brightness for a black display is suppressed low and no gray scale inversion can be observed within a viewing angle of 30°.

Comparative Example 2

A liquid crystal display, which is similar to that in Example 2 except the aligned orientation direction, is fabricated. In this liquid crystal display, only black with a bluish tone can be displayed for a black display when the voltage is not applied.

Example 3

Similar to Example 1, a pixel is divided by the multi-rubbing technique. Here, the pixel is divided into 4 domains by rubbing while shifting the positions of the two substrates. Using a compensation film like Example 2, the same measurement is conducted. As a result, like results in both the up/down and right/left directions are obtained, and no gray scale inversion can be observed.

Example 4

A TFT substrate with a pixel size of 200 μm×50 μm is used. The display electrode is covered with a nitrided amorphous silicon layer and is divided into a first sub-pixel and a second sub-pixel depending on the difference in thickness. Since the nitrided amorphous silicon layer is an electric capacity disposed in series to the liquid crystal capacity, the voltages applied to the liquid crystal layer corresponding to the first and second sub-pixels are different from each other.

This TFT substrate and a color filter substrate are adhered through a spacer to give a gap of 5.2 μm. Both the substrates are with an alignment film(AL 1051) coated and rubbed. When the substrates are adhered, they are disposed with the rubbing directions 90° to each other. Then, injecting a nematic liquid crystal, adhering a compensation film and polarization films like Example 2. From the results of microscope measurement of the liquid crystal display, a voltage applied to the low voltage-applying area is about 60%. Measuring the liquid crystal display like Example 2, the gray scale inversion region in the up/down direction is more than 30°.

Example 5

A liquid crystal display, which is similar to that in Example 2 except using a TFT substrate like Example 4, is fabricated. Measuring this liquid crystal display like Example 2, even in the up/down direction, no gray scale inversion can be observed within 60°.

Although the invention has been described with respect to specific embodiment for complete and clear disclosure, the appended claims are not to be thus limited but are to be construed as embodying all modification and alternative constructions that many be occurred to one skilled in the art which fairly fall within the basic teaching here in set forth.

What is claimed is:

1. A liquid crystal display, including at least a polarization film and a liquid crystal layer and displaying a black tone when a voltage is not applied, comprising:
    a compensation film disposed between said liquid crystal layer and said polarization film, and having an optical structure with a twist direction reverse to a twist direction of the liquid crystal molecules in said liquid crystal layer; and
    a pixel region in said liquid crystal layer is divided into four domains each said domain having the same twist direction of the liquid crystal molecules in said liquid crystal layer.

2. A liquid crystal display, according to claim 1, wherein:
    said liquid crystal layer has a positive refractive index anisotropy and said compensation film has a negative refractive index anisotropy.

3. A liquid crystal display, according to claim 1, wherein:
    said four domains have different rising directions of liquid crystal molecule when said voltage is applied.

4. A liquid crystal display, according to claim 2, wherein:
    said four domains have different rising directions of liquid crystal molecule when said voltage is applied.

5. A liquid crystal display, according to claim 1, wherein:
    said four domains include at least one domain with a different applied voltage.

6. A liquid crystal display, according to claim 2, wherein:
    said four domains include at least one domain with a different applied voltage.

7. A liquid crystal display, according to claim 3, wherein:
    said four domains include at least one domain with a different applied voltage.

8. A liquid crystal display, according to claim 4, wherein:
    said four domains include at least one domain with a different applied voltage.

9. A liquid crystal display, including at least a polarization film and a liquid crystal layer and displaying a black tone when a voltage is not applied, comprising:
    a compensation film disposed between said liquid crystal layer and said polarization film, and having an optical structure with a twist direction reverse to a twist direction of the liquid crystal molecules in said liquid crystal layer;
    said liquid crystal layer having a positive refractive index anisotropy and said compensation film has a negative refractive index anisotropy;
    wherein a pixel region in said liquid crystal layer is divided into at least three domains each said domain having the same twist direction of the liquid crystal molecules in said liquid crystal layer and different rising directions of their respective liquid crystal molecules when said voltage is applied; and
    said at least three domains include at least one domain with a different applied voltage.

* * * * *